United States Patent [19]

Colosky

[11] Patent Number: 5,625,557
[45] Date of Patent: Apr. 29, 1997

[54] AUTOMOTIVE CONTROLLER MEMORY ALLOCATION

[75] Inventor: Mark P. Colosky, Vassar, Mich.

[73] Assignee: General Motors Corporation, Detroit, Mich.

[21] Appl. No.: 431,924

[22] Filed: Apr. 28, 1995

[51] Int. Cl.$^6$ .................................................. G06F 7/70
[52] U.S. Cl. ............... 364/424.04; 395/250; 395/421.03; 395/421.04; 340/459; 340/870.07
[58] Field of Search ......................... 364/424.03, 424.04, 364/431.11, 431.12, 478; 395/448, 457, 470, 775, 250, 146, 700, 500, 800, 427, 728, 884, 600, 375, 421.04, 424.03; 340/459, 870.09, 518, 529

[56] References Cited

U.S. PATENT DOCUMENTS

| | | | |
|---|---|---|---|
| 4,068,298 | 1/1978 | Dechant et al. | 395/600 |
| 4,156,907 | 5/1979 | Rawlings et al. | 395/200.01 |
| 4,271,402 | 6/1981 | Kastura et al. | 364/424.04 |
| 4,277,772 | 7/1981 | Kastura et al. | |
| 4,292,669 | 9/1981 | Wollum et al. | 395/884 |
| 4,905,185 | 2/1990 | Sakai | 364/DIG. 1 |
| 4,945,551 | 7/1990 | Itomitsu et al. | 395/375 |
| 5,125,094 | 6/1992 | Kyuma | 395/250 |
| 5,446,864 | 8/1995 | Burghardt et al. | 395/427 |
| 5,454,098 | 9/1995 | Pisello et al. | 395/500 |
| 5,469,363 | 11/1995 | Saliga | 364/478 |

*Primary Examiner*—Kevin J. Teska
*Assistant Examiner*—Jacques Louis-Jacques
*Attorney, Agent, or Firm*—Michael J. Bridges

[57] ABSTRACT

Automotive controller lookup table reference values are reduced as necessary so as to be stored in standard controller memory device locations by reducing, through a minimum number of standard reduction values, the magnitude of any reference value requiring more than one standard location for storage and by recording the number of standard reduction values applied to each reference value so that, upon retrieving any one reference value, the proper magnitude adjustment may be expediently made thereto to restore the reference value magnitude to its original value.

10 Claims, 6 Drawing Sheets

AUTOMOTIVE CONTROLLER MEMORY ALLOCATION

FIELD OF THE INVENTION

This invention relates to electronic controllers for automotive vehicles and, more particularly, to electronic controllers for storing and accessing information.

BACKGROUND OF THE INVENTION

Rather than carry out complex or time consuming calculations in automotive control, diagnostic, or maintenance routines, it is known that certain functional relationships may be pre-calculated and stored in automotive controller non-volatile memory in the form of look-up tables. Rather than apply look-up values, such as sensed parameter values, to a series of calculations representing potentially complex functions, the values may be used as pointers or index values into pre-calculated look-up tables to retrieve a corresponding indexed table value. Such tables typically store a point to point relationship between the look-up (index) values and the reference values. Such models may require only a few stored table values in the rare case when the relationship is highly linear or when model accuracy is not critical. More commonly however, a single look-up table can require hundreds of stored table values, such as when the model is highly non-linear and when model accuracy is critical, or when the range of lookup (index) values is broad. To reference values from such lookup tables, standard lookup routines have been developed to rapidly identify a reference value in the table corresponding to a provided lookup value. The speed and accuracy of the techniques help make look-up tables an attractive alternative to complex, time consuming mathematical functions. Look-up tables have become so attractive in automotive control, diagnostics and maintenance systems that a substantial portion of automotive controller memory is commonly devoted to storage of such tables. Unfortunately, controller memory is not a free resource. Indeed, conventional controllers often prefer internal memory to expanded memory, to maximize data security and to minimize system cost and size. Internal memory is a severely limited resource of typical controllers. Any memory allocation approach which reduces memory requirements would therefore be desirable. Such allocation should not significantly impact controller operation. That is, such allocation should not reduce automotive control, diagnostics, or maintenance accuracy, or significantly increase the time required to carry out controller operations.

SUMMARY OF THE INVENTION

The present invention overcomes the shortcomings associated with conventional controller memory allocation by addressing the substantial memory requirements of conventional look-up tables, and providing for efficient look-up table memory allocation and table entry retrieval, reducing look-up table size without significantly increasing table entry retrieval time and without compromising table entry accuracy.

More specifically, a standard storage unit in a memory device is defined and each of the entries of a lookup table adjusted so as to fit within the standard storage unit. The lookup table is then stored in the memory device with each table entry occupying no more than one standard storage unit. The look-up table adjustments required to provide for such a compact storage of the entries are themselves stored in the memory device as breakpoints in the table. When a table entry is to be retrieved, any breakpoints associated with the entry to be retrieved are used to adjust the retrieved entry to restore the original magnitude thereof. The accuracy of data retrieval is not compromised yet memory requirements are dramatically reduced. The time of data access and restoration is not significantly greater than that of conventional approaches requiring much more memory for table storage, by efficiently identifying and storing the location of breakpoints so that the number of breakpoints are minimized and so that only simple and fast controller operations are required to restore the magnitude of the table entries.

BRIEF DESCRIPTION OF THE DRAWINGS

The invention may be best understood be reference to the preferred embodiment and to the drawings in which.

DESCRIPTION OF THE PREFERRED EMBODIMENT

Figure 1:
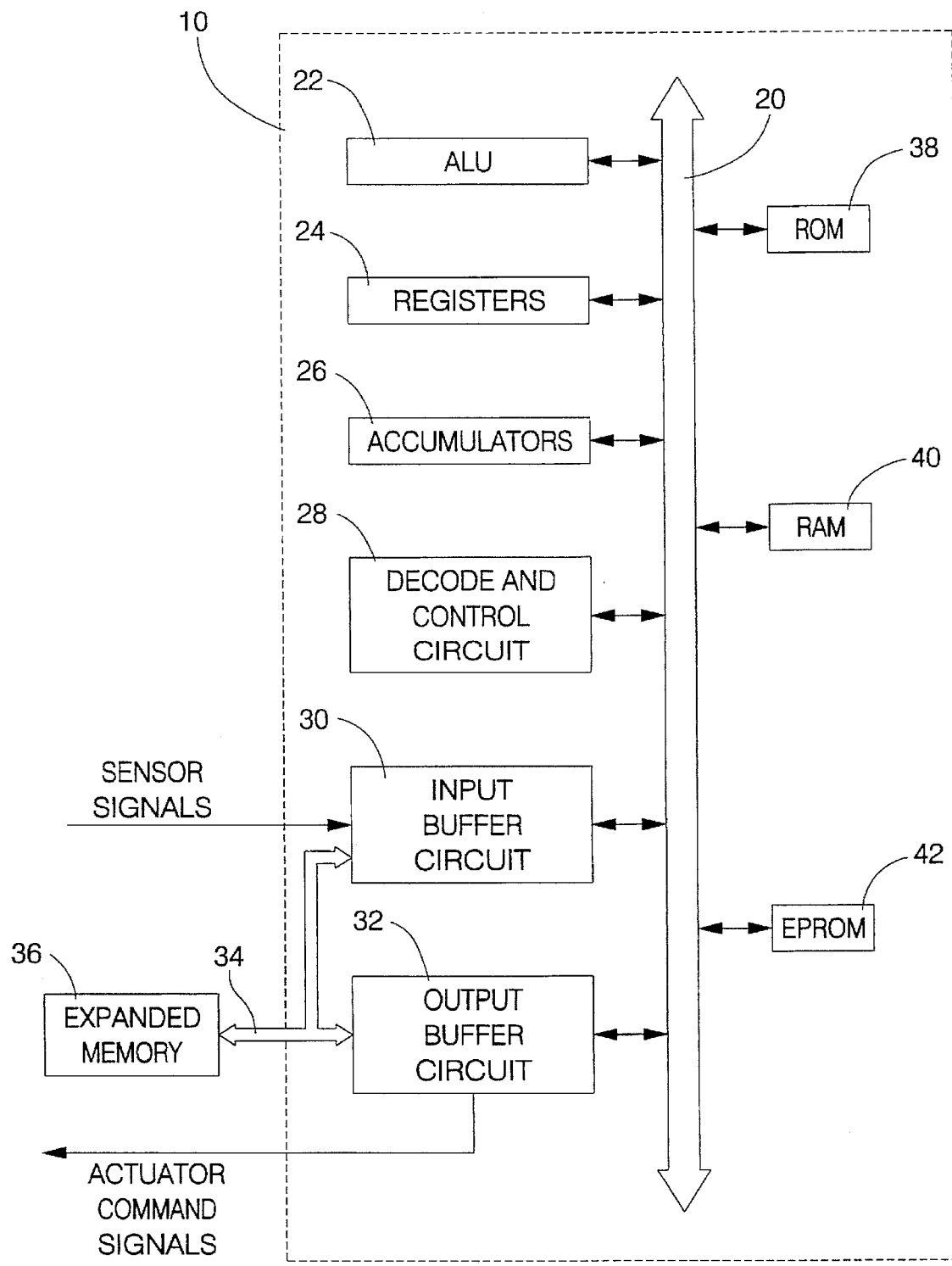
FIG. 1 is a general schematic diagram of the processor hardware configured to carry out this invention in accord with the preferred embodiment.

Referring to FIG. 1, a conventional single chip microcontroller is schematically described, such as a conventional Motorola MC68HC11A8 including such conventionally known elements as communication link 20 for providing controller communications, including address, data and control communications between conventional microcontroller elements. Such elements include an arithmetic logic unit ALU 22 for carrying out arithmetic, data access and certain control operations, a series of data registers 24 for temporary and fast access storage of data including memory pointers, accumulators 26 for temporary data storage providing fast access by ALU 22, signal decode and control circuitry 28 for decoding address and data information and providing control signals to the various elements of the microcontroller 10, input buffer circuit 30 for receiving and buffering input signals, such as signals from conventional automotive sensors and from expansion bus 34 for receiving data from an expanded memory unit 36, output buffer circuit 32 for receiving output signals and buffering and conditioning the signals and outputting the signals in the form of actuator command signals to various conventional automotive actuators, or in the form of control, address and data signals on expanded bus 34 to expanded memory unit 36. For storage of various microcontroller data, various memory devices are provided as is generally understood in the art. Such memory devices include a read only memory unit ROM 38 for permanent storage of data including data stored in the form of look-up tables which may include a schedule or plurality of indexed reference values that may be retrieved as a function of an index value determined and applied to the ROM 38 by ALU 22 or by decode and control circuitry 28. The index value in this embodiment is applied as an address offset in the table away from a table start address, and the table entry at the address pointed to by the offset is read and stored for use by the ALU 22, as will be described.

The memory devices further include a random access memory circuit RAM40 for short term or temporary storage of microcontroller data, which includes a volatile memory devices which may be cleared upon microcontroller power-down or reset operations as is generally understood in the art. The memory devices of microcontroller 10 further include electrically programmable read only memory EPROM devices 42 such as devices that may be electronically erasable or may be erased through application of ultraviolet radiation to a portion of the device 42. Other conventional memory devices may further be included for data storage as is generally understood in the art.

Through the operations of microcontroller 10 to provide for automotive vehicle control, diagnostics, and maintenance functions, arithmetic logic unit 22 may access from the read only memory ROM device 38 or EPROM device 42 certain data stored in the form of look-up tables. In this embodiment, the microcontroller 10 has a standard data storage unit of one byte which is made up of eight binary bits of stored data which may store values ranging from 0 to 255. Each byte corresponds to an individual address in read only memory 38. Conventional lookup tables may require two byte entries to accommodate table entries exceeding 255 under eight bit controller operation, such as that of the present embodiment. Indeed, for consistency, and to avoid complicating table lookup software which itself typically occupies ROM 38, all table entries may be stored as two byte entries, regardless of their magnitude. Such conventional practice greatly expands the memory requirements of conventional controllers.

The present invention provides for storage of lookup table entries including entries having significant magnitude at a single address, such as in a single byte storage location in the preferred embodiment having an eight bit controller 10 (FIG. 1). Specifically, lookup table entries that exceed a standard magnitude, such as 255 in the present embodiment having an eight bit controller, are reduced by a standard reduction value so as to fit in a memory location of standard size, such as a location having a single address. Flags are stored in memory devices indicating those table entries that were reduced, such that they may be restored to their original size when retrieved from the table during controller operation.

Figure 2:
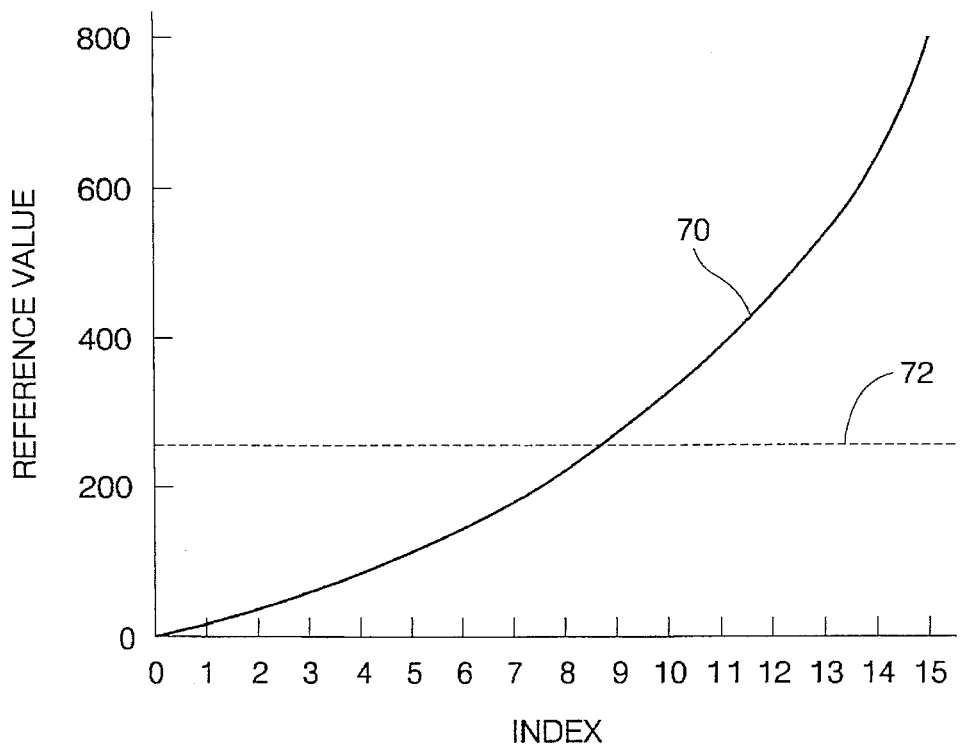
FIG. 2 is a graphical representation of a conventional two-dimensional monotonically increasing parameter relationship.

Curve 70 of FIG. 2 illustrates a representative parameter magnitude as a function of an index which may be a pointer or offset into a lookup table stored in ROM 38. The reference value may represent a control or diagnostic parameter that varies as a function of a lookup value which may also be called a table input value. The lookup value in this embodiment ranges between zero and fifteen, while the reference value ranges from zero to about 800. Rather than store a function in ROM 38 of FIG. 1 representing the relationship between the lookup value and the reference value, and require application of the lookup value to the function and solving of the function to arrive at the reference value, a lookup table may be conventionally stored and the reference value retrieved therefrom through a point to point relationship between the lookup value or parameter and the reference value. The table may appear in memory as a series of stored values as follows:

TABLE 1

| C1 | C2 |
|----|----|
| 0  | 00 |
| 1  | 00 |
| 2  | 00 |
| 3  | 2A |
| 4  | 00 |
| 5  | 3C |
| 6  | 00 |
| 7  | 55 |
| 8  | 00 |
| 9  | 6A |
| 10 | 00 |
| 11 | 78 |
| 12 | 00 |
| 13 | 8B |
| 14 | 00 |
| 15 | AF |
| 16 | 00 |
| 17 | CD |
| 18 | 00 |
| 19 | FF |
| 20 | 01 |
| 21 | 4A |
| 22 | 01 |
| 23 | 6F |
| 24 | 01 |
| 25 | D1 |
| 26 | 02 |
| 27 | 1D |
| 28 | 02 |
| 29 | 8A |
| 30 | 03 |
| 31 | 3A | in which C1 is a column of index offsets in ROM 38 away from a table start address and C2 is a column of reference values corresponding, row-by-row, to the column of index offsets. Column C1 is simply memory address offset information and not a stored memory value, whereas column C2 describes the table entries actually stored at the corresponding address offset away from the table start address, for example in ROM 38 or EPROM 42. For values in curve 70 of FIG. 2 exceeding the threshold magnitude of 255 represented by broken line 72 of FIG. 2, which are reference values corresponding to index values greater than nine, more than one byte of storage is conventionally required. For consistency and simplicity in lookup table access, all entries are assigned a common number of storage bytes, as illustrated in TABLE 1, leading to significant ROM requirements. To significantly reduce such memory requirements without adding appreciably to controller throughput burden, the curve 70 of FIG. 2 is broken up in the manner illustrated by curves 80-86 of FIG. 3 in accord with this invention. Specifically, and in accord with a critical aspect of this invention, each table entry that cannot be stored in a standard memory storage unit is reduced in magnitude by a standard reduction value, or by the smallest multiple of the standard reduction value that is needed to fit the entry into the standard memory storage unit. The number of reductions are stored and used to restore the magnitude of the entry upon its retrieval from the table. In graphical form, such an approach is illustrated in one example by curves 80-86 of FIG. 3, wherein when the curve crosses a standard magnitude threshold represented by curve 88, is it reduced by a standard value, illustrated by curve 82, and when curve 82 reaches or exceeds the threshold 88, it is again reduced resulting in curve 84, and is again reduced resulting in curve 86. Those entries having an index or memory offset of 0-9 have no reduction as illustrated by curve 80. Those having index values of 9-11 were reduced once, those with index values of 12-13 were reduced twice, and those with index values of 14 or 15 were reduced three times to provide that they fit in a single byte table entry in this embodiment. The form such as reduced table may take in this embodiment is illustrated as follows:

TABLE 2

| C3 | C4 |
|----|----|
| 0  | 0  |
| 1  | 2A |
| 2  | 3C |
| 3  | 55 |
| 4  | 6A |
| 5  | 78 |
| 6  | 8B |
| 7  | AF |
| 8  | CD |
| 9  | FF |
| 10 | 4A |

TABLE 2-continued

| 11 | 6F |
|----|----|
| 12 | D1 |
| 13 | 1D |
| 14 | 8A |
| 15 | 3A | in which C3 is a column of table index offsets from a table start address and C4 is the column of entry values corresponding, row-by-row, to the column of index offsets. In addition to this reduced table, a table is provided in ROM 38 pointing out the reference value breakpoints at which a magnitude reduction was required. In this embodiment, such breakpoint table is stored as follows:

TABLE 3

| 10 |
|----|
| 13 |
| 15 | in which the breakpoint table has a start and an end address, with the value stored at the start address being the first table entry of 10 and the value stored at the end address being the last table entry of 15. The use of this breakpoint table with the lookup table (TABLE 2) will be described in the operations of FIG. 4.

Figure 3:
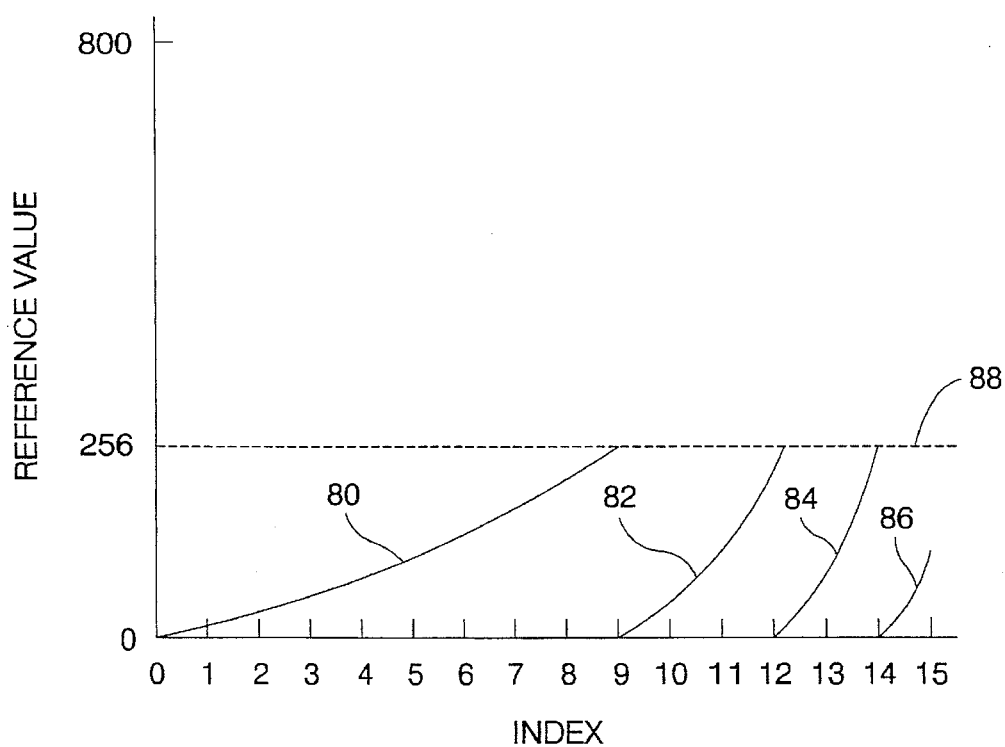
FIG. 3 is a graphical representation of the relationship of FIG. 2 providing for significant memory requirement reduction in accord with this invention.

As illustrated in TABLE 3, the values of curve 80 of FIG. 3 all may be stored in one byte table entries and therefore are stored as their direct values without any magnitude reduction applied thereto. However, the portion of the curve 80 that crosses threshold 88 which corresponds to a one byte storage unit threshold in this embodiment is reduced by a standard magnitude reduction of 256 resulting in a shift of the relationship between the index and the reference value of FIG. 3 or indexes 9, 10, 11 and 12 as illustrated in curve 82. The curve 84 illustrates a second standard magnitude reduction required to maintain storage within the predetermined standard storage unit in the memory device by reducing the relationship between the index and the reference value by yet another standard magnitude reduction of 256 in this embodiment. Still further, the curve 84 crosses the threshold 88 at index 14 requiring yet another standard magnitude reduction so as to fit the reference value into the standard storage unit in the ROM 38 (FIG. 1), resulting in the curve 86 for indexes 14 and 15.

The curve 70 of FIG. 2, as broken up in accord with this embodiment as described in curves 80-86 of FIG. 3, is monotonically increasing, which generally means the reference value will not decrease for an increasing index value as is generally understood in the art. A specific set of operations is provided in FIG. 4 in accord with this embodiment to retrieve and restore values in monotonically increasing lookup tables, such as TABLE 3 corresponding to FIG. 3. The operations of FIG. 4 are executed whenever a reference value in a monotonically increasing lookup table is to be referenced as a function of a provided index value of lookup value.

Figure 4:
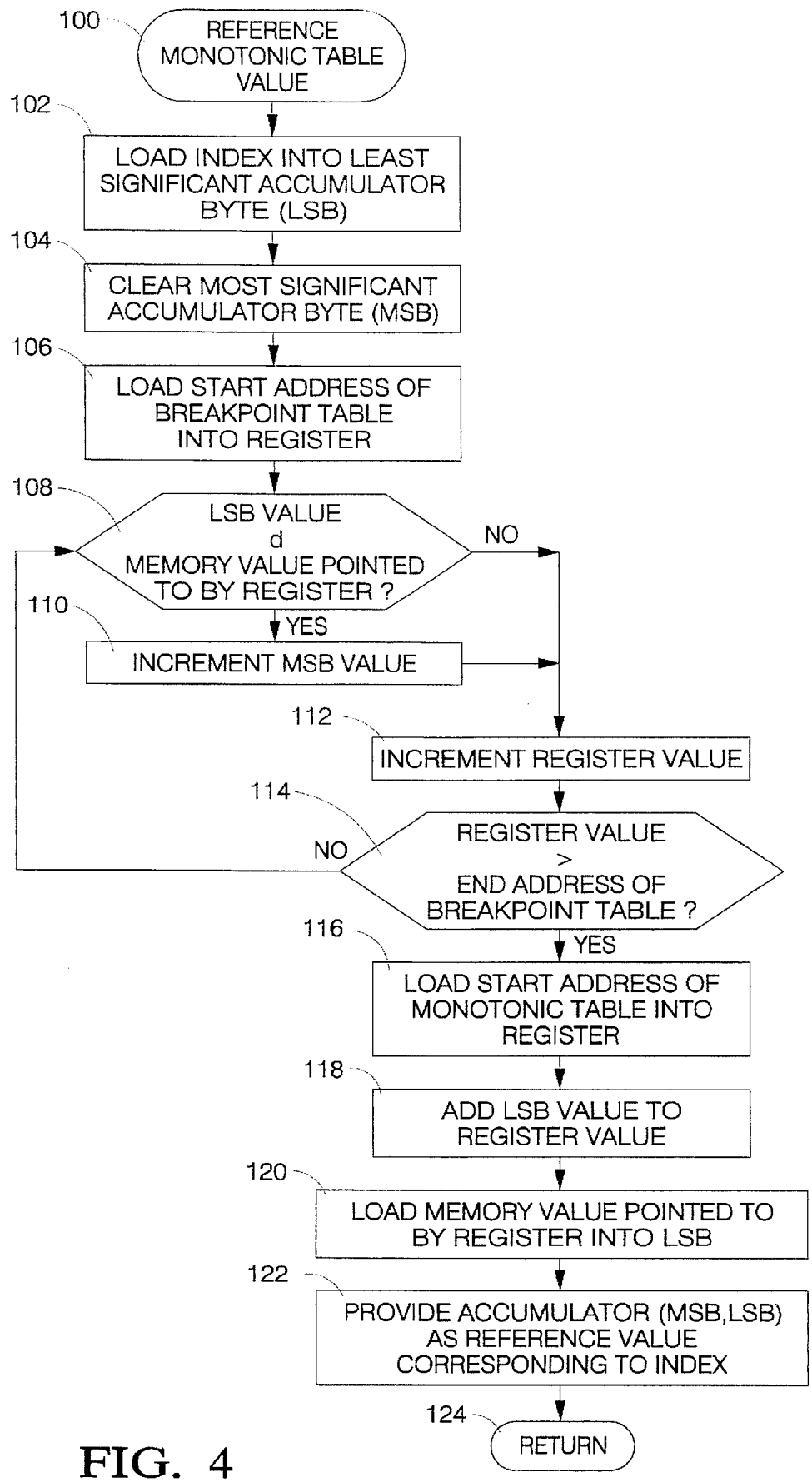
FIG. 4 is a flow of operations of the processor hardware of FIG. 1 for referencing a value from a look-up table in a monotonically increasing parameter relationship in accord with this invention.

Specifically, the operations of FIG. 4 start at a first step 100, and proceed to a next step 102 to load the provided index value corresponding to the reference value to be retrieved into the least significant byte (LSB) of the accumulator such as a sixteen bit accumulator from the set of accumulators 26 of FIG. 1. The index may be provided by the ALU 22 of FIG. 1 and by a control circuit 28 of FIG. 1, by generating a desired lookup position in the current lookup table through conventional ALU 22 operations, for example as a function of sensed or calculated engine operating condition indicators, and by determining and providing to accumulator 26 of FIG. 1 via bus 20 an index value corresponding to the desired lookup position.

The accumulator in this embodiment is a standard 16 bit accumulator for supporting mathematical operation is and manipulations on controller data. To determine the stored breakpoints for a retrieved reference value in the lookup table so as to identify the number of stored magnitude reductions required to store the retrieved reference value into a predetermined storage unit in a memory device, the controller 10 of FIG. 1, through the apparatus thereof including ALU 22 and control circuitry 28, examines the provided index stored in the LSB to the breakpoint table, through the operations of steps 106–114, to be described. The ALU 22, at step 110 and at step 122, restores the magnitude of the retrieved reference value by adding a standard value of 256 in this embodiment to the 16 bit accumulator for each magnitude reduction indicated through the operations of steps 106–114.

Returning to step 102 of FIG. 4, after loading the provided index into the least significant bit LSB of the accumulator, the most significant byte (MSB) of that accumulator is cleared at a next step 104 wherein all eight bits of that accumulator byte are set to zero. The routine then proceeds to a step 106 to load the start address of the breakpoint table corresponding to the lookup table currently being accessed into a standard 16 bit controller register such as one of the standard 16 bit index registers 24 of FIG. 1 which are used for referencing, pointing and indexing operations of controller 10 (FIG. 1) as is generally understood in the art.

After loading that starting address of the breakpoint table into the register at step 106, the index value stored in the LSB at step 102 is compared to the memory value pointed at by the register which is the first entry in the breakpoint table. If the LSB value (the provided index) is greater than or equal to the first breakpoint, then the routine proceeds to a step 110 to increase by one the most significant byte MSB of the accumulator. This will account for the first shift or breakpoint that has been applied to the reference value corresponding to the provided index that resides in LSB.

After incrementing the value stored in the MSB at the step 110 or if the LSB value is less than the first breakpoint at the step 108, the routine proceeds to a step 112 to increment the register value to point at the next breakpoint in the breakpoint table. The routine then proceeds to a step 114 to compare the register value to the address of the end of the breakpoint table to determine if all breakpoints have been processed. If the register value exceeds the end address of the breakpoint table, the restoration of the magnitude of the reference value is substantially complete and the routine proceeds to step 116, to be described. However, if the register value was less than or equal to the end address of the breakpoint table, the routine returns to the step 108 to compare the index stored in the LSB of the accumulator to the next breakpoint in the breakpoint table, as pointed at by the register. If the index value is again less than or equal to the next breakpoint value at the step 108, the MSB value is incremented again to account for the next breakpoint in the table and so on. Through the steps 108–114 then, for each breakpoint in the look up table being accessed that has resulted in a standard magnitude reduction in the reference value being retrieved, MSB is incremented.

After completing the process of restoring the value through the steps 108–114, the implications of which will become readily apparent, the routine proceeds to a step 116 to load the start address of the lookup table currently being accessed into a register from the registers 24 of FIG. 1. The routine next proceeds to a step 118 to add the LSB value to the register value to provide for the index offset into the table pointing to the current reference value to be retrieved. The combination of the LSB value representing the provided index into the table and the register value representing the start address of the current table yields the physical address of the reference value that is needed for the controller operations which invoked the routine of FIG. 4. The reference value at the register address is next loaded into LSB at a next step 120, by the control circuit 28 of FIG. 1 and the ALU 22 of FIG. 1 pointing to the appropriate memory address stored in the register and the control circuit 28 providing the contents of the memory device, such as ROM 38 or EPROM 42 at such address, to be available as the data on the bus 20. While such data is available on the bus 20, the control circuit 28 then provides for the LSB of the accumulator to take on the value of the data on the bus.

Accordingly, and as provided at a next step 122, the sixteen bits of the accumulator contains a full sixteen bit reference value corresponding to the provided index using a lookup table made up of only eight bit entries and requiring a minimum of additional processing steps in accord with this invention. Any incrementing of MSB provided at the step 110, provided for an increase in the values referenced by 256 for each increment to account for the shifting down of the table entry magnitude to fit the entry into the standard memory storage unit. Such may be provided for the monotonically increasing relationship between index values and reference values in accord with one embodiment of this invention. Returning to FIG. 4, after providing the reference value in the sixteen bit accumulator, the routine returns, via a next step 124, to the operations of the routine from which the operations of FIG. 4 were invoked, wherein the sixteen bit accumulator value will be used for control and diagnostics operations as the reference value corresponding to the index provided for use in the routine of FIG. 4, as described.

Figure 5:
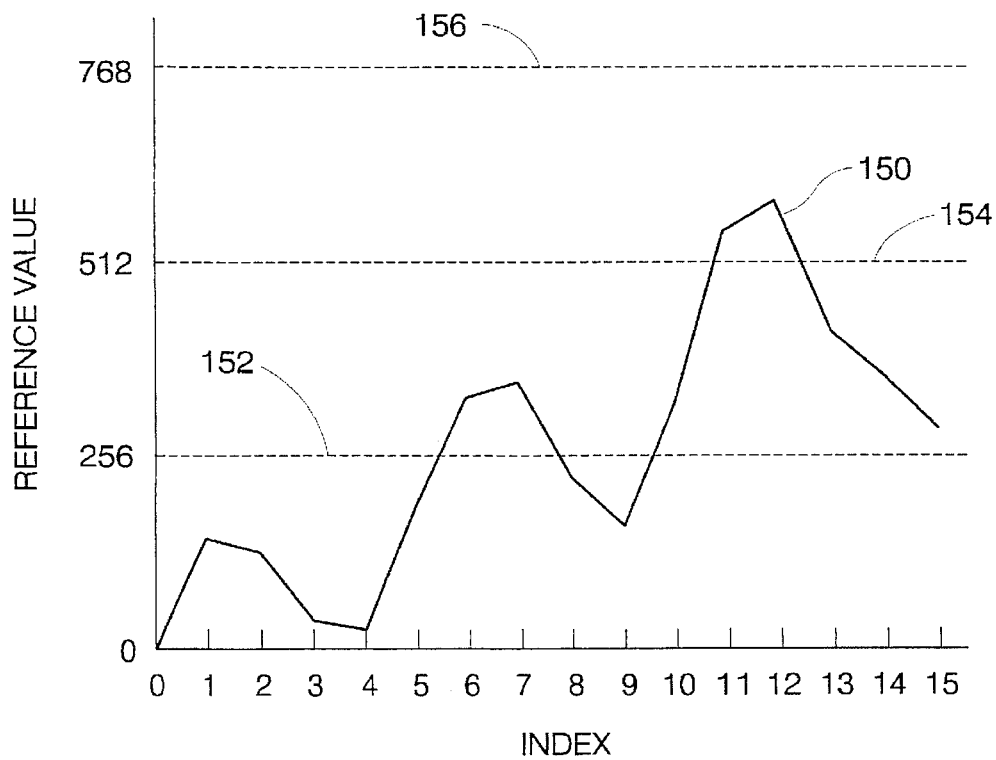
FIG. 5 is a graphical representation of a conventional two-dimensional non-monotonically increasing parameter relationship.

To provide for significant reduction in memory requirements in accord with this invention for parameter relationships that may not be monotonically increasing (but could be), such as the relationship of FIG. 5, further storage and retrieval operations are provided in accord with this invention.

Figure 6:
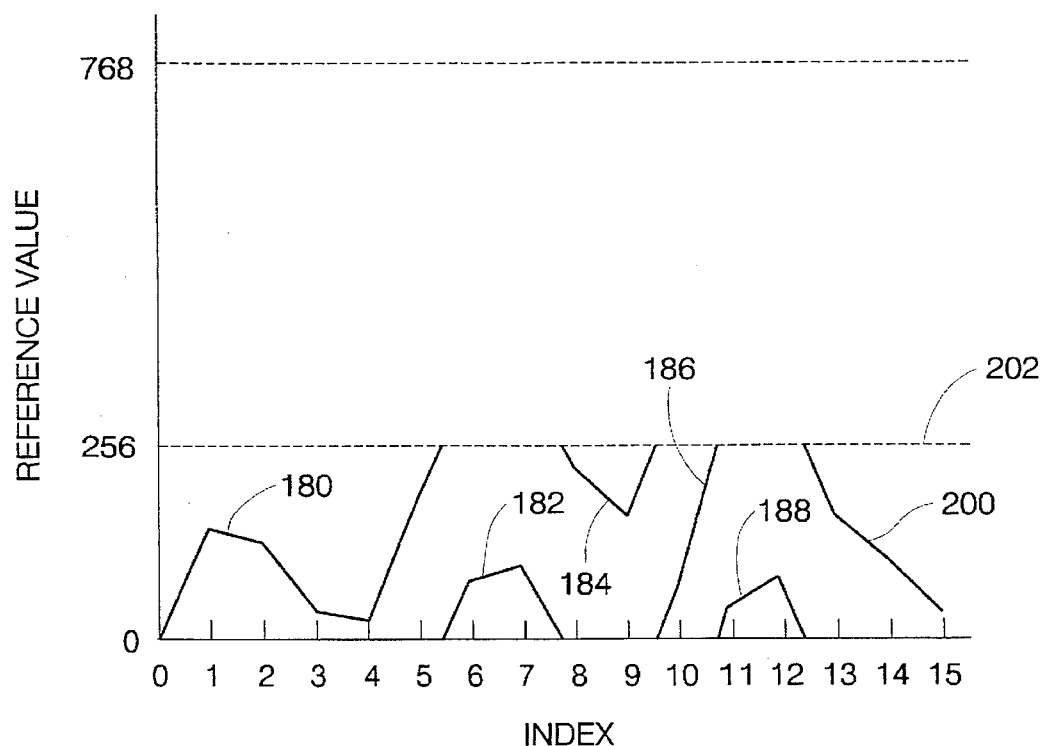
FIG. 6 is a graphical representation of the relationship of FIG. 5 providing for significant memory requirement reduction in accord with this invention.

Specifically, non-monotonic curve 150 of FIG. 5 having reference values that exceed threshold values 256 and 512 illustrated by reference lines 152 and 154, respectively, has reference values that vary in increasing and decreasing directions with increasing index values. To provide for storage of such reference values in a standard storage unit in ROM 38 (FIG. 1), standard magnitude reductions are applied at a number of breakpoints along the plurality of indexes ranging from 0–15. In the eight bit controller of this embodiment, it is desired that only eight bit table entries be used, and that any value requiring more than eight bits, i.e. and table entry having a magnitude greater that 255, be reduced by the minimum number of standard reduction values needed to fit the entry into one byte. Specifically, entries having indexes of 6, 7, 10, and 13–15 must be reduced, such as by 256 in this embodiment, to fit into a one byte table entry, and entries having indexes of 11 and 12 must be reduced further, such as by 512 in this embodiment (2*256) to fit into the signal byte table entry. Such a reduction results in a relationship between the index and the reference value as generally illustrated in FIG. 6. No reduction is required for curve 180, which corresponds to the curve between indexes 0 and 6 in FIG. 5. However, curve 182 is reduced from the curve 150 of FIG. 5. Such reduction is not required for curve 184 however, corresponding to the portion of curve 150 between indexes 8 and 10. Still further, curve 186 has been reduced by one standard reduction amount, as well as curve 200. Curve 188 corresponds to portions of curve 150 lying above threshold 154 of FIG. 5, for which two standard reductions were required. Upon reducing and storing the entries as single byte lookup table entries in this manner, which is intended to correspond generally to the approach of the monotonically increasing case of this embodiment, such as that of FIG. 3 and TABLE 2, breakpoint tables are established and stored to indicate the location of magnitude adjustments. In the case providing for both non-monotonically increasing and monotonically increasing relationships between reference values and indexes, two breakpoints tables are provided, one indicating when a standard decrease in table entry magnitude has been required (an UP BREAKPOINT TABLE), corresponding to the described TABLE 3, and another indicating when a standard increase in table entry magnitude is required (a DOWN BREAKPOINT TABLE), such as when a relationship between the index and the reference value drops below a magnitude threshold, such as any of the thresholds of broken lines 152, 154, and 156 of FIG. 5 (or further a threshold having a value that is any multiple of 256 in this embodiment). Such breakpoint tables provide a convenient means of marking lookup table index positions at which a magnitude adjustment has been provided to store signal storage unit entries above that breakpoint in the table.

For example, the curve 150 of FIG. 5 broken up for storage in accord with this embodiment in the manner illustrated in FIG. 6, an UP BREAKPOINT TABLE will be stored in ROM 38 as follows:

TABLE 4

| 6 |
|---|
| 10 |
| 11 | and a DOWN BREAKPOINT TABLE will be stored in ROM 38 as follows:

TABLE 5

| 8 |
|---|
| 13 | indicating, in just a few bytes of additional ROM 38 (FIG. 1), that a decrease was applied to reference values having an index of six or greater, another was applied for reference values having an index of 10 or greater, and yet another was applied for reference values having an index of 11 or greater, and also that a decrease was applied to correct such decreases for reference values having an index of 8 or greater, and another was provided for reference values having an index of 13 or greater.

This approach for identifying those reference values in a look-up table having reduced magnitude entries is but one way to record such information for efficient retrieval and application in accord with this invention. It should be appreciated that a variety of conventional techniques for storage, retrieval and application of such flags may be provided through the exercise of ordinary skill in the art without departing from the scope of this invention.

Figure 7A:
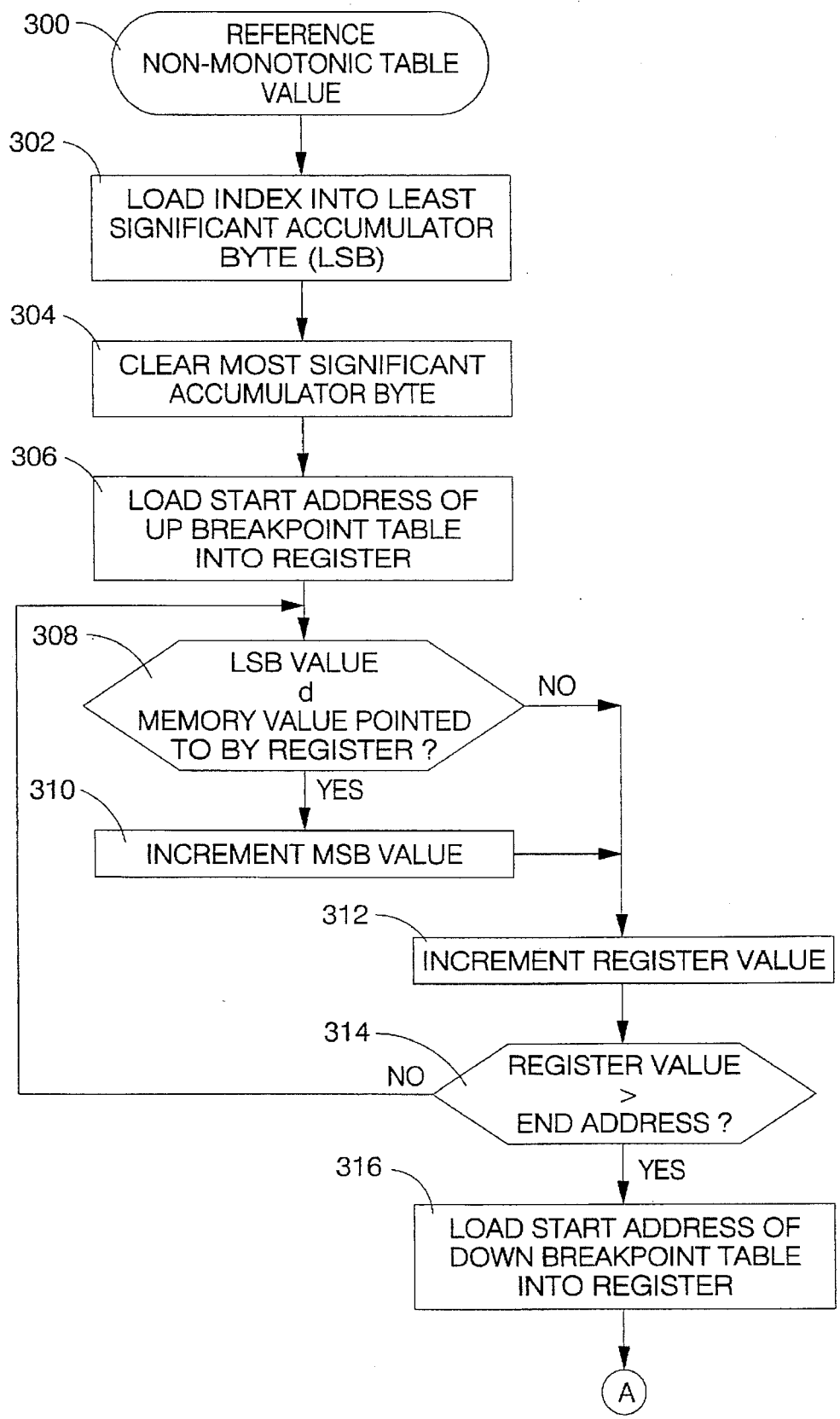
FIGS. 7A and 7B are flowcharts describing a flow of operations of the processor hardware of FIG. 1 for referencing a value from a look-up table in at least a non-monotonically increasing parameter relationship in accord with this invention.
Figure 7B:
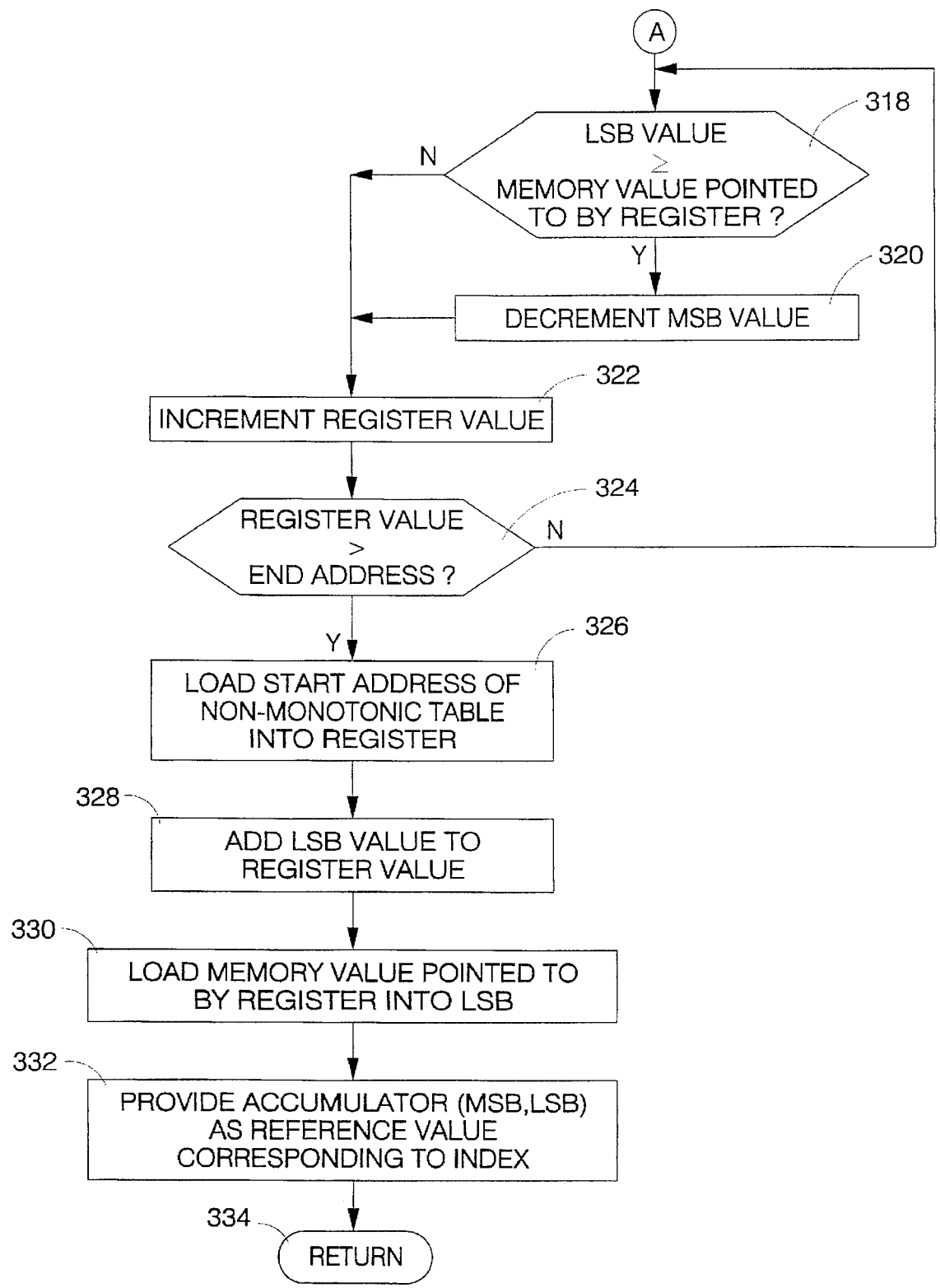

Returning to FIG. 6, and TABLES 4 and 5, to provide for controller operations for retrieval of reference values from lookup tables including non-monotonic lookup tables having reduced memory requirements in accord with this invention, controller operations of FIG. 7 are provided. These operations are executed by controller 10 of FIG. 1 whenever a reference value is to be reference from a lookup table stored in that manner described for FIG. 6.

The routine of FIG. 7 is invoked in the manner described for FIG. 4, starting at a step 300 and proceeding to a next step 302 to load the index provided by the controller operations that invoked the operations of FIG. 7 for pointing to the desired reference value of the lookup table currently being accessed into the least significant LSB of the accumulator, such as accumulator 26 of FIG. 1 having a 16 bit size. The loading operations of step 302 may be carried out through the apparatus and in the manner described for carrying out the step 102 of FIG. 4. After loading that index into LSB, a step 304 is executed to clear the most significant accumulator byte MSB or the upper 8 bits of the 16 bit accumulator. Next, the start address of the UP BREAKPOINT TABLE (TABLE 4, in this embodiment) is loaded into a register such as an index register for storing pointers and index values as is generally understood in the art, for example one of the 16 bit registers 24 of FIG. 1. As described, the UP BREAKPOINT TABLE will include single byte entries illustrating the points of the stored lookup table at which a standard magnitude reduction value was applied. The start address of the UP BREAKPOINT TABLE of this embodiment (TABLE 4) is the address at which table entry 6 is stored. To determine the stored breakpoints in either the form of up breakpoints or down breakpoints corresponding to the reference value to be retrieved, and to restore such retrieved reference value, as is provided in the following steps 308-326, the apparatus described for such operations at the steps 106-114 may be used, for example for carrying out the operations of steps 308-326.

After loading the start address of the UP BREAKPOINT TABLE at a step 306, the step 308 is executed to compare the provided index value stored in LSB to the memory value pointed at by the register which is the first entry in the UP BREAKPOINT TABLE. If the LSB value exceeds or is equal to the value pointed at by the register, the routine proceeds to a step 310 to increment MSB to account for the breakpoint stored in the breakpoint table, such as was provided at the step 110 of FIG. 4). Next, or if the LSB value was less than the UP BREAKPOINT TABLE entry pointed at by the register, a step 312 is executed to increment the register value to point to the next entry in the UP BREAKPOINT TABLE.

Next, the register value is compared to the end address of the UP BREAKPOINT TABLE, such as the address at which the entry 11 is stored in TABLE 4. If the register value exceeds the end address of the UP BREAKPOINT TABLE at the step 314, then all of the table entry decreases have been compensated for the current entry being retrieved, and the routine then proceeds to a next step 316, to be described. However, if the end address of the UP BREAKPOINT TABLE has not been exceeded by the register value at the step 314, the routine returns to the step 308 to process the next up breakpoint. Specifically, the index value stored in LSB is compared to the next breakpoint value at a step 308.

If the index value exceeds or is equal to the next breakpoint value, then the routine proceeds to a step 310 to again increment the MSB value so as to account for the next breakpoint which was required in the original storing of the current reference value being retrieved. After incrementing MSB at the step 310, or if the LSB value was less than the next breakpoint value at the step 308, the routine proceeds to a step 312 to increment the register value to point to the next breakpoint table entry, and so on, until all UP BREAKPOINT TABLE entries have been processed and all necessary increases to restore the value of the currently retrieved reference value have been provided through the steps 308–314. After completing these steps, the steps 318–324 are processed to provide any magnitude correction required to accurately restore values referenced according to the index value of the LSB of the accumulator.

Generally, the DOWN BREAKPOINT TABLE (TABLE 5) is provided for table entry magnitude correction in accord with this embodiment to decrease the restored value of the relationship between the index and reference values for reference values that have dropped below any of an established number of reference magnitudes. To process such down breakpoints, a first step 318 is executed to compare the LSB value holding the provided index to the first DOWN BREAKPOINT TABLE entry which is pointed at by the register value. If the index is greater than or equal to the first down breakpoint, a step 320 is next executed to decrement or reduce by one the current MSB value to provide a correction for an unnecessary increment of the MSB value that occurred at the previously executed step 310. In other words, MSB was incremented at the step 310 to account for a reference value increase above 255 (or an integral number thereof). The decrement of step 320 provides a correction to the MSB for a reference value decrease below 255 (or an integral number thereof) at index values less than the provided index.

Next, or if the LSB value was less than the current DOWN BREAKPOINT TABLE entry, a next step 322 is executed to increment the register value to point to the next entry in DOWN BREAKPOINT TABLE. Next, a step 324 is executed to compare the register value which is the address of the next entry in the DOWN BREAKPOINT TABLE to the end address of the table, such as the address at which the entry 13 is stored in the TABLE 5. If the register value exceeds the end address of the table at the step 324, then all down breakpoints in the current lookup table have been processed and any corrections have been provided to the MSB. The routine then proceeds to a step 326, to be described.

However, if the register value is less than or equal to the end address of the DOWN BREAKPOINT TABLE at the step 324, the routine returns to the step 318 to compare the index stored in the LSB to the next DOWN BREAKPOINT TABLE entry. Again, if this next table entry is less than the current index value, the MSB must be again decremented at a step 320 to provide for further correction for an unnecessary incrementing of MSB at the step 310. After providing such correction, or if the LSB value was less than the current table entry at the step 318, the routine proceeds to the step 322 to increment the register value and point to the next entry in the DOWN BREAKPOINT TABLE, as described. The process of analyzing down breakpoints is provided as shown for each entry in the DOWN BREAKPOINT TABLE to determine the relationship between the number of down breakpoints and the current index value.

After providing for any reductions or corrections of the MSB value through the steps 318–324, a next step 326 is executed to load the start address of the lookup table currently being accessed into the register, such as the 16 register from the set of registers 24 of FIG. 1. The start address points to the beginning of the table or the series of table entry values that is currently being accessed. After loading the starting address of the table into the register, a step 328 is executed to add the LSB value to the register to point, through the index stored in the LSB, to the specific table entry that is to be accessed. Next, the memory value pointed at by the register (the desired table reference value) is loaded into LSB as an eight bit entry in accord with this embodiment at a next step 330. This step 330 may be carried out using the apparatus and in the manner described for the step 120. The routine next advances to a step 322 at which the sixteen bit accumulator entry (MSB,LSB) is provided as a sixteen bit table entry pointed at by the provided index, for use in control and diagnostics operations that invoked the routine of FIG. 7. The routine of FIG. 7 then proceeds to a next step 334 to return to the routine from which it was called, so that control, diagnostics and maintenance operations may be carried out with benefit of the reference value provided through the operations of FIG. 7.

The preferred embodiment for the purpose of explaining this invention is not to be taken as limiting or restricting this invention since many modifications may be made through the exercise of ordinary skill in the art without departing from the scope of this invention.

The embodiments of the invention in which a property or privilege is claimed are described as follows:

1. An apparatus for retrieving a reference value from a plurality of stored, indexed reference values in a memory device, wherein a series of breakpoints are stored in the memory device identifying a number of standard magnitude reduction required to store each of the plurality of reference values into a predetermined storage unit in the memory device, comprising:

means for providing an index for identifying a reference value to be retrieved from the plurality of reference values;

means for retrieving the reference value identified by the provided index;

means for determining the stored breakpoints for the retrieved reference value to identify the number of stored magnitude reductions required to store the retrieved reference value into a predetermined storage unit in the memory device;

means for restoring the magnitude of the retrieved reference value by the identified number of standard magnitude reductions to provide the reference value from the plurality corresponding to the provided index.

2. The apparatus of claim 1, wherein the means for providing an index comprises:

an arithmetic logic unit; and microcontroller decode and control circuitry.

3. The apparatus of claim 1, wherein the means for retrieving comprises:

a read only memory device;

an arithmetic logic unit; and microcontroller control circuitry.

4. The apparatus of claim 1, wherein the means for determining comprises an arithmetic logic unit.

5. The apparatus of claim 1, wherein the means for restoring comprises an arithmetic logic unit.

6. An apparatus for retrieving a reference value from an indexed function comprising a plurality of reference values stored in a minimum storage space within a memory device, wherein each of the plurality of reference values requiring more than one predetermined memory storage unit for storage in the memory device is reduced in magnitude from an original reference value magnitude by a minimum number of predetermined standard magnitude reduction values needed to allow for storage of the reference value in one predetermined memory storage unit, the apparatus comprising:

a memory device for logging the minimum number of predetermined standard magnitude reduction values for each reduced reference value;

means for providing an index value corresponding to a desired reference value to be retrieved from the stored plurality;

means for determining the logged number of predetermined standard magnitude reduction values for the desired reference value;

means for increasing the magnitude of the desired reference value in accord with the determined logged number to restore the original reference value magnitude of the desired reference value; and means for providing the restored desired reference value as the reference value corresponding to the provided index value.

7. The apparatus of claim 6, wherein the means for providing an index value comprises an arithmetic logic unit.

8. The apparatus of claim 6, wherein the means for determining the logged number comprises:

a read only memory device;

an arithmetic logic unit; and microcontroller decode and control circuitry.

9. The apparatus of claim 6, wherein the means for increasing the magnitude comprises an arithmetic logic unit.

10. The apparatus of claim 6, wherein the means for providing the restored desired reference value comprises:

microcontroller control circuitry; and an arithmetic logic unit.

* * * * *